United States Patent
Hayes et al.

(10) Patent No.: US 11,104,762 B2
(45) Date of Patent: Aug. 31, 2021

(54) SILICONE-MODIFIED POLYESTER COATING

(71) Applicant: Valspar Sourcing, Inc., Minneapolis, MN (US)

(72) Inventors: Gregory B. Hayes, Apple Valley, MN (US); Thomas J. Melnyk, Greenfield, MN (US)

( * ) Notice: Subject to any disclaimer, the term of this patent is extended or adjusted under 35 U.S.C. 154(b) by 10 days.

(21) Appl. No.: 15/940,685

(22) Filed: Mar. 29, 2018

(65) Prior Publication Data

US 2018/0251594 A1 Sep. 6, 2018

Related U.S. Application Data

(63) Continuation of application No. 15/178,791, filed on Jun. 10, 2016, now abandoned, which is a continuation of application No. PCT/US2014/069331, filed on Dec. 9, 2014.

(60) Provisional application No. 61/917,147, filed on Dec. 17, 2013.

(51) Int. Cl.
- C08G 63/695 (2006.01)
- C09D 143/04 (2006.01)
- C09J 167/00 (2006.01)
- C09D 183/10 (2006.01)
- C08G 77/445 (2006.01)

(52) U.S. Cl.
CPC ......... *C08G 63/695* (2013.01); *C08G 77/445* (2013.01); *C09D 143/04* (2013.01); *C09D 183/10* (2013.01); *C09J 167/00* (2013.01)

(58) Field of Classification Search
None
See application file for complete search history.

(56) References Cited

U.S. PATENT DOCUMENTS

| | | | |
|---|---|---|---|
| 2,500,843 A | 3/1950 | MacKenzie et al. | |
| 2,571,029 A | 10/1951 | Goodwin | |
| 2,584,351 A | 2/1952 | Hunter et al. | |
| 4,125,498 A | 11/1978 | Blount | |
| 4,370,441 A | 1/1983 | Gaske et al. | |
| 4,412,302 A | 10/1983 | Nossen | |
| 4,465,712 A | 8/1984 | McVie | |
| 4,608,421 A | 8/1986 | Lin | |
| 4,618,657 A | 10/1986 | Katchko et al. | |
| 4,657,951 A | 4/1987 | Takarada et al. | |
| 4,683,271 A | 7/1987 | Lin et al. | |
| 4,804,732 A | 2/1989 | Ryntz et al. | |
| 4,968,751 A * | 11/1990 | Miles | C08F 8/42 524/355 |
| 5,136,063 A | 8/1992 | O'Lenick, Jr. | |
| 5,169,641 A | 12/1992 | Jorda et al. | |
| 5,227,435 A | 7/1993 | Kang et al. | |
| 5,623,027 A | 4/1997 | Lewarchik et al. | |
| 6,187,863 B1 | 2/2001 | Wilt et al. | |
| 6,657,001 B1 | 12/2003 | Anderson et al. | |
| 7,396,893 B2 | 7/2008 | Greene et al. | |
| 2004/0180221 A1 | 9/2004 | Lin et al. | |
| 2007/0021579 A1* | 1/2007 | Greene | C08G 63/6954 528/26 |
| 2012/0057224 A1 | 3/2012 | Story et al. | |
| 2012/0208955 A1* | 8/2012 | Yoshie | C08G 18/4233 524/604 |
| 2013/0197254 A1* | 8/2013 | Li | C08G 77/12 556/467 |

FOREIGN PATENT DOCUMENTS

| | | |
|---|---|---|
| CN | 1042163 C | 2/1999 |
| CN | 102504265 A | 6/2012 |
| CN | 102977351 A | 3/2013 |
| CN | 102336898 B | 3/2015 |
| GB | 583754 | 12/1946 |

OTHER PUBLICATIONS

International Search Report and Written Opinion for International Application No. PCT/US2014/070096 dated Apr. 19, 2015. (14 pages).

International Search Report and Written Opinion for International Application No. PCT/US2014/069331 dated Mar. 4, 2015. (9 pages).

Pearce et al.: "Hydrogen Bond Interactions and Self-Condensation of Silanol-Containing Polymers in Polymer Blends and Organic-Inorganic Polymeric Hybrids," Published May 4, 2000 American Chemical Society. (14 pages).

\* cited by examiner

*Primary Examiner* — Shamim Ahmed
*Assistant Examiner* — Bradford M Gates

(57) ABSTRACT

A silicone-modified polyester resin and methods for making the resin are described herein. The method includes production of a siliconized intermediate which is then esterified to give a silicone-modified polyester resin. Coating compositions including the silicone-modified polyester resin are provided, and coated articles with the coating composition applied to at least a portion of a surface thereof are also provided.

16 Claims, No Drawings

SILICONE-MODIFIED POLYESTER COATING

CROSS REFERENCE TO RELATED APPLICATION(S)

This application is a continuation of pending International Application No. PCT/US2014/069331, filed 9 Dec. 2014, which claims priority from U.S. Provisional Application No. 61/917,147, filed 17 Dec. 2013, each of which is incorporated herein by reference in its entirety.

BACKGROUND

Polymer coating compositions are routinely applied to substrates, especially metal substrates. Such coatings are used for a variety of reasons, including, for example, to protect the substrate from degradation, to beautify the substrate (e.g., to provide color, brightness, etc.), and/or to reflect light.

Many such polymer coating compositions are applied on planar substrates (e.g., using coil coating processes) that are subsequently formed into finished articles, including articles used as exterior building materials. In general, for a coating composition to be used as an exterior coil coating, the composition must demonstrate long-term outdoor weathering, durability and improved wear resistance.

Thermosetting silicone-modified polyester coatings can be used for exterior coil coating applications. Conventionally, such polyester coatings are made by condensation of a polysiloxane with a reactive resin, resulting in a functionalized curable polyester. Conventionally, an excess of the polysiloxane is needed to provide a coating with the appropriate wear and weather resistance. However, because the polysiloxane is not reactive, it concentrates at the surface of the coating during cure, leading to fouling of the baking oven and unwanted deposition of silica particles. Moreover, such coating tend to have poor cure dwell times and poor storage stability.

Accordingly, there is a continuing need for thermosetting silicone-modified polyester for use in coil coatings that provide reduced cure dwell times and increased line speed capability, while not causing oven or coating damage.

SUMMARY

In one embodiment, the present description provides a method of making a silicone-modified or siliconized polyester. The method includes steps of providing at least one hydroxy-functional silicone compound, and at least one hydroxy-functional compound, combining these to obtain a siliconized hydroxy-functional polymer, which is then esterified by reaction with a carboxylic acid-functional compound or derivatives thereof.

In another embodiment, the present description provides a coating composition including a silicon-polyester block copolymer that is a reaction product of at least one hydroxy-functional silicone compound, at least one hydroxy-functional compound and at least one carboxylic acid-functional compound or derivatives thereof.

In yet another embodiment, the present invention provides a method of producing an article from a metal substrate, wherein the substrate has, disposed on at least a portion of its surface, a cured coating formed from the coating composition described herein.

In still another embodiment, the present description provides a coated article made from a metal substrate with the coating composition described herein applied and cured on at least one major surface of the substrate.

Definitions

Unless otherwise specified, the following terms as used herein have the meanings provided below.

Substitution is anticipated on the organic groups of the polyesters and other polymeric resins used in the coating compositions described herein. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "hydrocarbyl moiety" refers to unsubstituted organic moieties containing only hydrogen and carbon. As used herein, the term "group" is intended to be a recitation of both the particular moiety, as well as a recitation of the broader class of substituted and unsubstituted structures that includes the moiety.

The term "crosslinker" refers to a molecule capable of forming a covalent linkage between polymers or between two different regions of the same polymer.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers). Similarly, unless otherwise indicated, the use of a term designating a polymer class such as, for example, "polyester" is intended to include both homopolymers and copolymers (e.g., polyester-urethane polymers).

The term "unsaturation" when used in the context of a compound refers to a compound that includes at least one double bond that is not present in an aromatic ring.

As used herein, the term "silicone" refers to polymerized siloxanes or polysiloxanes, which are mixed inorganic-organic polymers with the general structural formula $[R_2SiO]n$, where R is substituted or unsubstituted C1-C12 alkyl, C1-C12 alkoxy, C6-C10 aryl, and the like. The silicone may include reactive functional groups, such as, for example, hydroxy-functional or alkoxy-functional groups, and the like.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

In one embodiment, the present description provides a method of making a siliconized or silicone-modified polyester. The method preferably comprises the steps of providing at least one hydroxy-functional silicone compound and at least one hydroxy-functional compound (i.e. not containing silicone). These compounds are combined to provide a siliconized hydroxy-functional compound, which is then esterified by reaction with a carboxylic-acid functional compound or derivative thereof. The esterification reaction product is a siliconized or silicone-modified polyester. The silicone-modified polyester or silicon polyester block copolymer can be used as a component in a coating composition, preferably a composition for use in coil coating applications, including weatherable coil coatings for exterior use. In addition, it is contemplated that the silicone-modified polyester described herein will have utility in coating compositions used with other coating application techniques such as, for example, powder coating, extrusion, or lamination.

In an embodiment, the method described herein includes steps for making a silicone-modified or siliconized polyester. The siliconized polyester is preferably a block copolymer of silicone and polyester, formed by the reaction of at least one silicone-functional compound with at least one compound having other reactive functional groups such as, for example, compounds with hydroxyl, carboxyl, anhydride, acyl, or ester functional groups. In a preferred aspect, the siliconized polyester is formed by the reaction of at least one silicone-functional compound and at least one hydroxy-functional compound to produce a hydroxy-functional siliconized intermediate which is then esterified to produce a silicone-modified polyester.

Suitable silicone-functional compounds include, for example, polymerized siloxanes (also known as organosiloxanes or organic polysiloxanes) of the general formula $[R_2SiO]_n$, where R is typically C1-C12 alkyl (preferably methyl or ethyl), C1-C12 alkoxy (preferably methoxy or ethoxy), aryl (preferably phenyl), and the like. In an aspect, the polymerized siloxanes include reactive functional groups, such as hydroxyl groups, alkoxy groups, silanol groups, and the like. In an aspect, the polymerized siloxane used in the method described herein has low number average molecular weight (Mn) of about 100 to 2000, preferably 500 to 1200, or weight average molecular weight (Mw) of about 200 to 4000, preferably about 1000 to 2400.

Conventionally, siliconized polyesters are made by reaction of reactive organo-siloxanes or polymerized siloxanes with polyester resins having reactive functional groups. Specifically, siliconized polyesters are typically prepared by the reaction of a hydroxy-functional polyester with a hydroxy-functional or alkoxy-functional organic polysiloxane. The hydroxy-functional polyester is typically a highly branched low molecular weight polyester, or a linear high molecular weight polyester. The siloxane and polyester are combined in approximately stoichiometric amounts in a condensation reaction to provide the siliconized polyester.

Without limiting to theory, it is believed that the conventional method includes a condensation reaction between the siloxane and polyester, where the hydroxyl functional groups of the polymerized siloxane backbone react by self-condensation, producing a semi-interpenetrating siloxane network, characterized by a backbone that is predominantly derived from silanol functionality, i.e. —Si—OH groups.

In contrast, the method described herein for making a siliconized polyester involves a co-condensation reaction between hydroxy-functional silicone, i.e. a hydroxy-functional polymerized siloxane, for example, with a molecular weight ($M_n$) of less than 5000 (or Mw of less than 10,000), preferably about 500 to 1200, and a reactive hydroxy-functional compound., i.e. a diol or polyol. The reaction produces a polymer with predominantly silyl ether functionality, i.e. —Si—O—Si—R groups rather than silanol or siloxane functionality, as determined by liquid $^{29}$Si NMR. The formed polymer is then esterified by reaction with an acid-functional compound.

In contrast, the method described herein for making a siliconized polyester involves a co-condensation reaction between hydroxy-functional silicone, i.e. a hydroxy-functional polymerized siloxane, for example, with a molecular weight ($M_n$) of less than 5000 (or Mw of less than 10,000), preferably about 500 to 1200, and a reactive hydroxy-functional compound., i.e. a diol or polyol. The reaction produces a polymer with predominantly silyl ether functionality, i.e. —Si—O—Si—R groups rather than silanol or siloxane functionality, as determined by liquid $^{29}$Si NMR. The formed polymer is then esterified by reaction with an acid-functional compound.

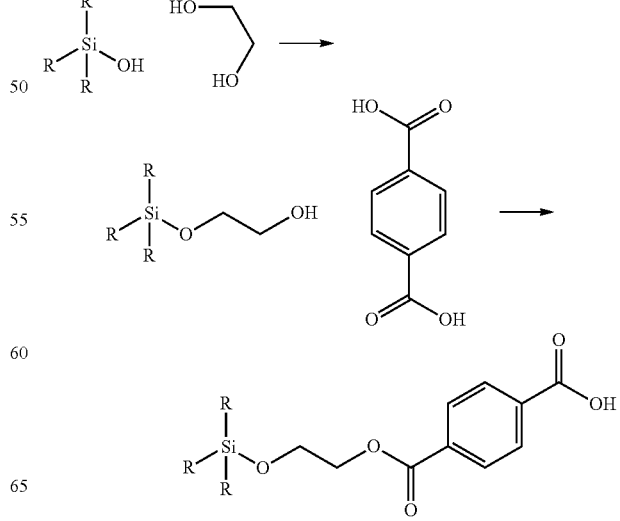

In an embodiment, the method described herein includes steps for making a silicone-modified or siliconized polyester. The siliconized polyester is preferably a block copolymer of silicone and polyester, formed by the reaction of at least one silicone-functional compound with at least one compound having other reactive functional groups. In an embodiment, the silicone-modified or siliconized polyester has molecular weight (Mw) of less than about 10,000, preferably 3000 to about 4500. Without limiting to theory, it is believed that the Mw of the polymer will vary with hydroxyl (OH) number. The physical and performance properties of a cured coating formed from the siliconized polyester are optimal when the OH number is at least about 85.

Suitable compounds with reactive functional groups include, for example, compounds with hydroxyl, carboxyl, anhydride, acyl, or ester functional groups. Hydroxyl functional groups are known to react, under proper conditions, with acid, anhydride, acyl, ester or other hydroxyl functional groups through a condensation reaction. Suitable compounds with reactive functional groups include mono-, di-, and multi-functional compounds. Di-functional compounds are presently preferred. Suitable reactive functional compounds include, for example, mono-, di-, or poly-functional alcohols or mono-, di-, or poly-functional acids, as well as compounds having two or more different types of functional groups (e.g., a compound having both an anhydride and an acid group, or a compound having both an alcohol and an acid group, etc.). In an aspect, the compound with reactive functional groups is a hydroxy-functional compound, preferably a polyol, more preferably a dihydroxy-functional compound, i.e. a diol, such as, for example, 1,6-hexanediol, pentaerythritol, trimethylolpropane, 2-methyl-1,3-propanediol, neopentyl glycol, 2-butyl-2-ethyl-1,3-propanediol, ethylene glycol, propylene glycol, 1,4-butanediol, 1,3-butanediol, 1,5-pentanediol, trimethylol ethane, 3-hydroxy-2,2-dimethylpropyl 3-hydroxy-2,2-dimethylpropionate (HPHP), and the like. In a preferred aspect, the diol used in the methods described herein includes, without limitation, 1,6-hexanediol, trimethylolpropane, neopentyl glycol, ethylene glycol, HPHP, and combinations thereof.

In an embodiment, the method described herein includes reacting at least one silicone-functional compound with at least one other compound having a reactive functional group, i.e. a hydroxyl-functional compound, for example. In an aspect, the silicone-functional compound and hydroxyl-functional compound are present in a ratio of 1:3, preferably in a ratio of 1:2.

In an embodiment, the method described herein includes the reaction of at least one hydroxy-functional silicone compound with at least one other hydroxy-functional compound to produce a hydroxy-functional siliconized intermediate. This intermediate is used to prepare a siliconized or silicone-modified polyester.

Accordingly, in an embodiment, the hydroxy-functional siliconized intermediate is reacted with a carboxylic acid-functional compound through an esterification reaction to produce a silicone-modified polyester. Suitable acid-functional compounds include mono-, di-, or poly-functional acids such as, for example, phthalic acid, phthalic anhydride, isophthalic acid, terephthalic acid, dimethyl terephthalate, benzophenone dicarboxylic acid, diphenic acid, 4,4-dicarboxydiphenyl ether, 2,5-pyridine dicarboxylic acid, 2,6-naphthalenedicarboxylic acid, 4-hydroxybenzoic acid, trimellitic acid, trimellitic anhydride, and combinations thereof. In a preferred aspect, the carboxylic acid-functional compound is a diacid including, for example, isophthalic acid, terephthalic acid, phthalic anhydride, maleic anhydride, and derivatives or combinations thereof.

The reaction between the hydroxy-functional siliconized intermediate and the carboxylic acid-functional compound includes stoichiometric ratios of the intermediate and the acid. Accordingly, in an embodiment, the intermediate and the acid-functional compound are present in a ratio of 1:1 to 1:2, preferably 1:1 to 1:1.5.

Esterification takes place almost quantitatively and may be monitored by determining the acid and/or hydroxyl numbers or by monitoring the Gardner-Holt viscosity of the product. Accordingly, in an embodiment, the silicone-modified polyester made by the methods described herein has a relatively low final acid number of less than about 20, preferably about 4 to 10, more preferably about 5 to 6, with a Gardner-Holt viscosity of N. The product has a color of 1 on the Gardner scale and is generally free of haze.

In an embodiment, the methods described herein are carried out in the presence of a processing aid, such as a catalyst, for example. Suitable processing aids include, without limitation, metal catalysts (e.g., stannous oxalate, stannous chloride, butylstannoic acid, dibutyl tin oxide, tetrabutyltitanate, or tetra butylzirconate), antioxidants (e.g., hydroquinone, monotertiarybutyl-hydroquinone, benzoquinone, 1,4-napthoquinone, 2,5-diphenyl-p-benzoquinone, or p-tert butylpyrocatechol), unblocked and blocked acid catalysts (e.g., dinonylnaphthalene sulfonic acid, dinonylnaphthalene disulfonic acid, dodecyl benzene sulfonic acid, p-toluene sulfonic acid, phosphate esters, and mixtures or combinations thereof), and mixtures thereof. In an aspect, the methods described herein are carried out in the presence of metal catalysts, preferably tetrabutyl titanate. The amount of catalyst depends on the amount and nature of the reactants, but is preferably up to about 5 wt %, more preferably up to about 2 wt %, based on the total weight of resin solids.

In an embodiment, the methods described herein produce a siliconized or silicone-modified polyester that can be included in a coating composition. In an aspect, the composition further includes a crosslinker or crosslinking agent. The crosslinker may be used to facilitate cure of the coating and to build desired physical properties. When present, the amount of crosslinker will vary depending upon a variety of factors, including, e.g., the intended end use and the type of crosslinker. Typically, one or more crosslinkers will be present in the coating composition in an amount greater than about 0.01 wt-%, more preferably from about 5 wt % to about 50 wt %, even more preferably from about 10 wt % to about 30 wt %, and most from about 15 wt % to about 20 wt %, based on total weight of resin solids.

Polyesters having hydroxyl groups are curable through the hydroxyl groups. Suitable hydroxyl-reactive crosslinking agents may include, for example, aminoplasts, which are typically oligomers that are the reaction products of aldehydes, particularly formaldehyde; amino- or amido-group-carrying substances exemplified by melamine, urea, dicyandiamide, benzoguanamine and glycoluril; blocked isocyanates, or a combination thereof.

Suitable crosslinkers include aminoplasts, which are modified with alkanols having from one to four carbon atoms. It is suitable in many instances to employ precursors of aminoplasts such as hexamethylol melamine, dimethylol urea, hexamethoxymethyl melamine, and the etherified forms of the others. Thus, a wide variety of commercially available aminoplasts and their precursors can be used. Suitable commercial amino crosslinking agents include those sold by Cytek under the tradename CYMEL (e.g., CYMEL 301, CYMEL 303, and CYMEL 385 alkylated melamine-formaldehyde resins, or mixtures of such resins, are useful) or by Solutia under the tradename RESIMENE.

Suitable crosslinkers may also include blocked isocyanates, such as, for example, as described in U.S. Pat. No. 5,246,557. Blocked isocyanates are isocyanates in which the isocyanate groups have reacted with a protecting or blocking agent to form a derivative that will dissociate on heating to remove the protecting or blocking agent and release the reactive isocyanate group. Some examples of suitable blocking agents for polyisocyanates include aliphatic, cycloaliphatic or aralkyl monohydric alcohols, hydroxylamines and ketoximes. Presently preferred blocked polyisocyanates dissociate at temperatures of around 160° C. The presence of a catalyst is preferred to increase the rate of reaction between the liberated polyisocyanate and the active hydrogen-containing compound (e.g., a hydroxyl-functional polyester). The catalyst can be any suitable catalyst such as, for example, dibutyl tin dilaurate or triethylene diamine.

In some embodiments, an ultraviolet curing crosslinker or an electron-beam curing crosslinker may be suitable. Examples of suitable such crosslinkers may include 1,6-hexanediol diacrylate, 1,4-butanediol diacrylate, trimethylolpropane triacrylate, or mixtures thereof.

Coating compositions including the silicone-modified polyester described herein may be produced by conventional methods known to those of skill in the art. Coating compositions including the silicone-modified polyester described herein are preferably made by blending the siliconized polyester resin with one or more other components in the presence of a crosslinker. In an embodiment, the blending process is carried out in a liquid carrier, preferably a solvent or mixture of solvents, preferably a solvent or blend of solvents having a kauri butanol number (Kb) of about 50 or more. Suitable polar solvents include, for example, ketones (i.e. acetone, methyl ethyl ketone, cyclohexanone, and the like) esters (e.g., dialkyl esters (such as dimethyl ester, diisobutyl ester, and the like), long chain acetates, and the like), alcohols, chlorinated hydrocarbons, ester-ethers (e.g., glycol ether-esters, ethyl-3-ethoxypropionate, commercially available as EEP from Eastman, and the like), and combinations or mixtures thereof.

Other additives known in the art, may be included in the coating composition described herein. These additives include, without limitation, pigments, flatting agents, flow or viscosity modifiers, waxes and/or other binders that may be included or dispersed in the coating composition.

The total amount of solids present in the coating composition described herein may vary depending upon a variety of factors including, for example, the desired method of application. For coil coating applications, the coating composition will typically include from about 30 to about 65 wt % of solids. In some embodiments, the coating composition may include as much as 80 wt % or more of solids.

Preferred cured coating compositions made with the silicone-modified polyester described herein have excellent adhesion, hardness, flexibility, and abrasion resistance. In particular, the cured coating compositions described herein demonstrate equivalent or improved weathering capabilities relative to commercially available weatherable coatings, along with improved flow and leveling and decrease in cure time. Weatherable coating compositions including the silicone-modified polyester are further described in Applicant's co-pending Application WO2015094817 entitled "Silicone-Modified Polyester Coating" filed 9 Dec. 2014.

The coating composition has utility in a multitude of applications. The coating composition of the invention may be applied, for example, as a mono-coat direct to metal (or direct to pretreated metal), as a primer coat, as an intermediate coat, as a topcoat, or any combination thereof. The coating composition may be applied to sheet metal such as is used for lighting fixtures, architectural metal skins (e.g., gutter stock, window blinds, siding and window frames and the like) by spraying, dipping, or brushing, but is particularly suited for a coil coating operation where the composition is applied onto the sheet as it unwinds from a coil and then baked as the sheet travels toward an uptake coil winder. It is further contemplated that the coating composition of the invention may have utility in a variety of other end uses, including, industrial coating applications such as, e.g., appliance coatings; packaging coating applications; interior or exterior steel building products; HVAC applications; agricultural metal products; wood coatings; etc. In a preferred aspect, the cured coating described herein is used as an exterior coating for building materials, architectural skins and the like.

Non-limiting examples of metal substrates that may benefit from having a coating composition of the invention applied on a surface thereof include hot-rolled steel, cold-rolled steel, hot-dip galvanized, electro-galvanized, aluminum, tin plate, various grades of stainless steel, and aluminum-zinc alloy coated sheet steel (e.g., GALVALUME sheet steel).

In an embodiment, a coating composition including the silicone-modified polyester described herein is applied to at least a portion of at least one major substrate of a planar metal substrate. The coating is then cured to provide a coated substrate that can then be formed into specific articles.

The coating is typically cured or hardened in a heated temperature environment of from about 200 to 500° C., more preferably from about 270 to 470° C. For coil coating operations, the coating is typically baked for about 8 to about 25 seconds to a peak metal temperature (PMT) of from about 200 to 250° C.

Test Methods

Unless indicated otherwise, the following test methods were utilized in the Examples that follow.

EXAMPLES

The present invention is illustrated by the following examples. It is to be understood that the particular examples, materials, amounts, and procedures are to be interpreted broadly in accordance with the scope and spirit of the invention as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Example 1

Preparation of Silicone-Modified Polyester 239 g of neopentyl glycol, 72 g of trimethylol ethane, and 1 g of tetrabutyl titanate (Tyzor TBT) were charged to a 2 L reaction flask equipped with an agitator, packed column, condenser, thermometer, and inert gas inlet. The reaction flask was flushed with inert gas and the contents heated to 70° C. Under agitation, 475 g of a hydroxy-functional silicone compound (Dow Z6018) were slowly added. The batch temperature was raised to 175° C. while removing water. The reaction was held at 175° C. until 15 mL of water were removed. The overhead packed column temperature was held below 95° C. The batch temperature was then lowered to 150° C. 221 g of isophthalic acid, 65 g of adipic acid and 1 g of FASCAT 4201 were then charged to the reaction flask. The batch temperature was then raised to 210° C. while removing water. The batch temperature was maintained at 210° C. until an acid number of less than 7.0 was achieved. The overhead packed column temperature was held below 100° C. The temperature was lowered to 100° C. by adding 108 g of AROMATIC 150 and 540 g of AROMATIC 100. The final acid number of the batch was 6.0. The final viscosity measured as a 57.2% solution in an 85/15 blend of AROMATIC 150 and AROMATIC 100 was U 1/2 (Gardner-Holt), and the measured color was 1 (Gardner scale). The resin solution was free of haze.

Liquid $^{29}$Si NMR results for the prepared polyester show a reduction in silanol groups and an increase in silyl ether groups.

Example 2

Alternate Preparation of Silicone-Modified Polyester 239 g of neopentyl glycol, 72 g of trimethylol ethane, 221 g of isophthalic acid, 475 g of a hydroxy-functional silicone compound (Dow Z6018), 65 g of adipic acid and 1 g FASCAT 4201 were charged to a 2 L reaction flask equipped with an agitator, packed column, condenser, thermometer and inert gas inlet. The reaction flask was flushed with inert gas and the contents heated to 210° C. while removing water. The bath temperature was maintained at 210° C. to achieve an acid number of less than 7.0 However, at acid number of about 16, the batch reached a gel point. The temperature was lowered and the gelled resin was discarded.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A method of making a silicone-modified polyester liquid coating composition, comprising:
    making a siliconized polyester by a method comprising
        providing at least 30% by weight of at least one hydroxy-functional silicone compound;
        providing at least one hydroxy-functional compound;
        reacting the hydroxy-functional silicone compound and the hydroxy-functional compound to produce a siliconized hydroxy-functional polymer having predominantly silyl ether functionality; and
        esterifying the siliconized hydroxy-functional polymer with at least one carboxylic acid-functional compound or derivative thereof to form the siliconized polyester having an acid number of 5 to 6; and
    blending the siliconized polyester with one or more other components in the presence of a crosslinker, wherein the blending process is carried out in a liquid carrier.

2. The method of claim 1, wherein the hydroxy-functional silicone has number average molecular weight (Mn) of 500 to 1200.

3. The method of claim 1, wherein the siliconized hydroxy-functional polymer has Mw of about 3000 to about 4500.

4. The method of claim 1, wherein the siliconized hydroxy-functional polymer has an OH number of at least about 85.

5. The method of claim 1, wherein the hydroxy-functional compound is a polyol.

6. The method of claim 1, wherein the hydroxy-functional compound is a polyol comprising at least one of 1,6-hexanediol, pentaerythritol, trimethylolpropane, 2-methyl-1,3-propanediol, neopentyl glycol, 2-butyl-2-ethyl-1,3-propanediol, ethylene glycol, propylene glycol, 1,4-butanediol, 1,3-butanediol, 1,5-pentanediol, trimethylol ethane, 3-hydroxy-2,2-dimethylpropyl 3-hydroxy-2,2-dimethylpropionate (HPHP), and combinations thereof.

7. The method of claim 1, wherein the hydroxy-functional compound is a polyol comprising at least one of 1,6-hexanediol, trimethylolpropane, neopentyl glycol, ethylene glycol, 3-hydroxy-2,2-dimethylpropyl 3-hydroxy-2,2-dimethylpropionate (HPHP), and combinations thereof.

8. The method of claim 1, wherein the carboxylic-acid functional compound is a polyacid or derivative thereof.

9. The method of claim 1, wherein the carboxylic-acid functional compound is a polyacid comprising at least one of phthalic acid, phthalic anhydride, isophthalic acid, terephthalic acid, dimethyl terephthalate, benzophenone dicarboxylic acid, diphenic acid, 4,4-di carboxydiphenyl ether, 2,5-pyridine dicarboxylic acid, 2,6-naphthalenedicarboxylic acid, 4-hydroxybenzoic acid, trimellitic acid, trimellitic anhydride, and combinations thereof.

10. The method of claim 1, wherein the hydroxy-functional silicone compound and the hydroxy-functional compound are present in a 1:2 ratio by weight.

11. The method of claim 1, wherein the siliconized hydroxy-functional polymer and the carboxylic acid-functional compound are present in a 1:1 ratio by weight.

12. The method of claim 1, wherein the siliconized polyester has a Gardner viscosity of N at 25° C.

13. The method of claim 1, further comprising a catalyst for the step of reacting the hydroxy-functional silicone compound and the hydroxy-functional compound.

14. The method of claim 13, wherein the catalyst comprises at least one of stannous oxalate, stannous chloride, butylstannoic acid, dibutyl tin oxide, tetrabutyltitanate, or tetra butylzirconate, and mixtures thereof.

15. The method of claim 13, wherein the catalyst is a tetrabutyl titanate catalyst.

16. A method, comprising:
    providing a planar metal substrate having the coating composition made by the method of claim 1 applied on at least a portion of the metal substrate; and
    curing the coating composition on the substrate to form a coated article.

* * * * *